Figure 1:
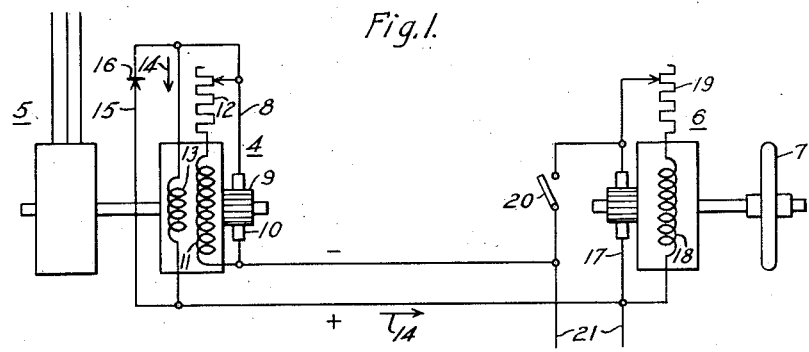

June 1, 1943.  G. L. ABELL  2,320,841

POLARIZED-FIELD GENERATOR

Filed Oct. 26, 1940

WITNESSES:
N. F. Susser.
Wm. C. Groome

INVENTOR
George L. Abell.
BY
O. B. Buchanan
ATTORNEY

Patented June 1, 1943

2,320,841

UNITED STATES PATENT OFFICE 2,320,841

POLARIZED-FIELD GENERATOR

George L. Abell, Pitcairn, Pa., assignor to Westinghouse Electric & Manufacturing Company, East Pittsburgh, Pa., a corporation of Pennsylvania Application October 26, 1940, Serial No. 362,914

5 Claims. (Cl. 172—239)

My invention relates to dynamo-electric machines, and it has more particular relation to compound direct-current generators which are utilized to supply power to variable-speed motors under such conditions that the motor sometimes operates regeneratively, feeding back power into the generator and running the risk of causing the cumulative series field of the generator to operate differentially, or in opposition to the shunt field of the generator, in response to the reverse-current flow. Such differential field-action, during regenerative operation, has heretofore frequently been so severe as to entirely overcome the shunt field of the generator, so as to reverse the polarity of the generator, thereby causing a highly undesirable voltage-dip and voltage-reversal, which has been so objectionable that many users of such equipment have gone to the expense of installing very much oversized generators, in order to prevent such polarity-reversal, while others have gone to the expense of providing a separate exciter for the generator, in order to prevent a permanent reversal of polarity.

The object of my invention is to overcome the above-mentioned difficulties with the simple expedient of a circuit-means, including rectifier-means, for so energizing the series field-winding of a compound self-excited generator that a path is provided for the flow of reversed armature-current in the generator, but the series field-winding is prevented from acting differentially under said reversed-current conditions.

A further object of my invention is to provide a dynamo-electric machine having an armature-circuit, a serially connected field-winding, and a rectifier-means connected in parallel-circuit relation to said field-winding.

A further object of my invention is to provide a dynamo-electric machine having two oppositely connected series field-windings in parallel-circuit relation to each other, and two oppositely connected rectifiers connected in series-circuit relation to the two parallel-connected field-winding means, respectively.

A further object of my invention is to provide a rectifier-bridge, or other double-wave rectifier-means, for energizing a field-winding of a dynamo-electric machine always in the same direction, regardless of the direction of current-flow in the armature of the machine.

With the foregoing and other objects in view, my invention consists in the apparatus, combinations, systems and methods hereinafter described and claimed, and illustrated in the accompanying drawing, wherein the three figures are diagrammatic views of circuits and apparatus illustrated my invention in three different forms of embodiment.

As shown in the drawing, my invention is applied to a cumulatively compounded, commutator-type, self-excited, direct-current generator 4, which is a part of a motor-generator set including also a polyphase motor 5, the generator 4 being utilized to supply power to one or more adjustable-speed direct-current motors 6 which may be utilized for various purposes, such as driving a grinder 7 or for other machine-shop purposes, or the like.

In Fig. 1, the generator 4 is provided with an armature-circuit 8 including the commutator 9 and brushes 10 of the machine. The generator is also provided with exciting field-winding means including a self-excited shunt field-winding 11 which is shunt-connected across the armature-circuit 8 through a variable field-rheostat 12. The exciting field-winding means of Fig. 1 also includes a cumulative series field-winding 13 which is connected in series with the armature-circuit 8, and in which the current flows in such direction that said series field-winding 13 acts accumulatively, after the manner of a cumulative series field-winding, that is, in the same direction as the shunt field-winding 11, during the normal generator-operation when said generator is supplying curent, flowing in the direction of the arrows 14, to a load-circuit which is indicated by the symbols (+) and (—).

In accordance with my invention, the generator 4, in the form of embodiment shown in Fig. 1, is provided with an auxiliary parallel-connected circuit 15, including a rectifier 16, connected in parallel-circuit relation to the series field-winding 13, the polarity of the rectifier 16 being such that it is substantially non-conducting during the normal generating action of the generator 4, and so that the rectifier 16 freely passes the reversed-flow currents during regenerative operation when power is flowing back into the generator from its load-circuit (+) and (—), thus diverting practically all of the reversed-current flow from the series field-winding 13, and preventing said series field-winding from acting differentially to any substantial extent, under these conditions. The rectifier-means 16 may be any assymmetrically conducting device which has the property of offering a relatively low impedance to the flow of current in one direction, while offering a relatively high impedance to the flow of current in the other direction. A satisfactory form of rectifier-means is a so-called contact rectifier such as a copper-oxide rectifier-means.

The load-circut (+) and (−) of the generator 4 is illustrated as comprising the variable-speed motor 6 which is illustrated as comprising an armature-circut 17, a shunt field-winding 18, a variable field-rheostat 19 in series with the field-winding 18, and a starting switch or controller which is diagrammatically indicated at 20. The generator load-circuit (+) and (−) may also be connected to other load-devices, as symbolically indicated by the load-circuit bus 21. Because of the provision of the motor-field rheostat 19, the speed of the motor 6 may be very rapidly changed, during the operation of the motor, and if the speed of the motor is very suddenly reduced, by this means, the motor will operate regeneratively, feeding power back into the generator 4, as previously described.

In operation, therefore, when power is being fed back into the generator 4, in the form of embodiment shown in Fig. 1, the feed-back current divides, almost all of it passing through the rectifier 16 in the conducting direction of the latter, so that practically none of the current passes through the series field-winding 13 in the differential direction, that is, the direction opposing the field produced by the shunt winding 11, the shunt-field remaining in the same polarity regardless of the direction of current-flow through the generator-armature circuit 8. In this way, I avoid any possibility of a reversal of polarity of the generator 4, no matter how severe may be the regenerative, or feed-back, operating-conditions. At the same time, I protect the field-flux of the shunt-field 11 from being "killed," or reduced to zero, thus aiding in maintaining the voltage-characteristic of the generator 4.

Figure 2:
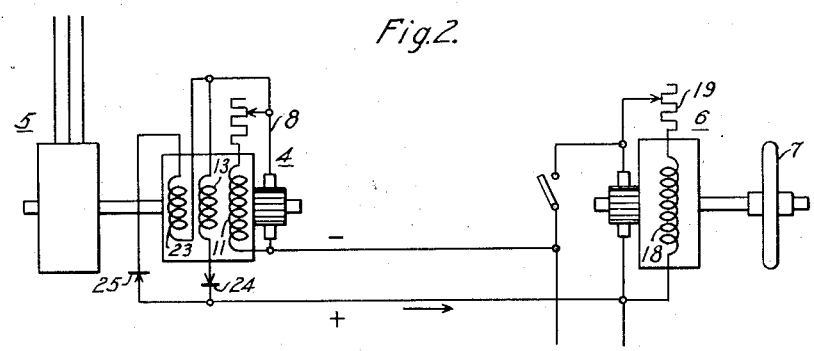

In Fig. 2, I show a form of embodiment of my generator 4, in which a differential series field-winding 23 is provided, in addition to the cumulative series field-winding 13. That is, the polarities of these two series field-windings 13 and 23 are opposite to each other, so that the cumulative winding 13 acts accumulatively when current flows through it in the generating direction, and so that the differential field-winding 23 acts accumulatively when current flows therethrough in the regenerative direction. Two oppositely-connected rectifier-means 24 and 25 are serially associated with the two oppositely connected series field-winding 13 and 23, respectively, so that the rectifier 24, in series with the cumulative field-winding 13, permits practically unrestricted current-flow therethrough in the generating direction, while substantially blocking most or all current-flow therethrough in the regenerating direction, whereas the other rectifier-means 25 permits the free flow of current through the differential series field-winding 23 in the regenerative direction, when power is being fed back into the generator from the load-circuit (+) and (−), while materially or substantially blocking current-flow through the differential field-winding 23 in the normal or generating direction during the normal operation of the generator 4.

The system shown in Fig. 2 has the advantage of causing the generator 4 to be cumulatively compounded during its regenerative operation, as well as during its normal generating operation. In this way, the generator-voltage during regenerative operation, far from being reduced, may be held substantially constant, or may be even increased, in any desired voltage-characteristic, during the time when current is flowing regeneratively into the generator 4 from the load-circuit (+) and (−). This strengthening of the generator field during regenerative operation not only assists in upholding the generator voltage during these critical times, but it also assists very materially in accelerating the speed-changes in the motor 6, that is, it causes the motor 6 to reduce its speed much more quickly when its field-rheostat 19 is suddenly moved, for example, to the full-field position in which the shunt field-winding 18 of the motor is directly connected across the motor-supply circuit (+) and (−) without any field-resistance in series therewith.

Figure 3:
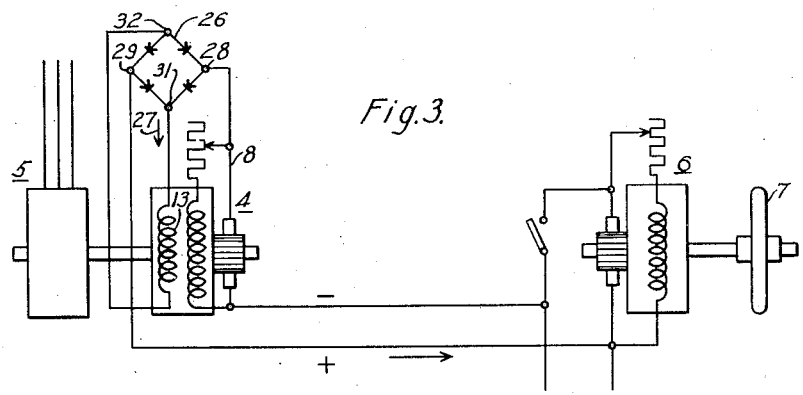

In Fig. 3, I show a means for providing results similar to those which are provided in Fig. 2, in a combination utilizing a conventional compound generator 4, with but a single series field-winding 13, but with external circuit equipment including a rectifier-bridge 26, or other full-wave rectifier-means, whereby current is fed through the series field-winding 13 in the same direction, as indicated by the arrow 27, regardless of the direction of current-flow in the generator armature-circuit 8 or in the terminal load-circuit (+) and (−). Thus, one diagonal of the rectifier-bridge 26, as represented by the terminals 28 and 29, is serially connected in series with the armature-circuit 8 and the load-circuit conductor (+). The other diagonal of the rectifier-bridge, as represented by the terminals 31 and 32, is connected to the respective terminals of the series field-winding 13.

In operation, the generator 4 of Fig. 3 operates quite similarly to the generator 4 of Fig. 2. The series field-winding 13 always acts accumulatively, regardless of whether the generator 4 is operating normally as a generator, or as receiving power from the load-circuit during regenerative feed-back conditions.

It will be noted, in both Figs. 2 and 3, that the field-winding compounding-effect is reversed when the generator-current reverses, the effect being that of a cumulative generator-field when the generator 4 is generating, and a differential generator-field or a cumulative motor-field when the generator 4 is motoring or receiving power from the motor 6.

While I have shown my invention in three different forms of embodiment, which are at present preferred by me, and while I have illustrated my invention in connection with a preferred type of use or service or application thereof, I desire it to be understood that such description and illustration are only illustrative, at least in regard to the broader aspects of my invention, as many changes may be made by those skilled in the art, by way of substitutions, omissions and additions, without departing from the broader spirit of my invention. I desire, therefore, that the appended claims shall be accorded the broadest construction consistent with their language.

I claim as my invention:

1. A combination including a compound direct-current self-excited generator and a load-circuit device connected to said generator, means for electrically connecting the load-circuit device for operation from said generator, means for driving said generator at a substantially constant speed at all times when said generator is in operative condition, said load-circuit device including a shunt motor and a driven load having sufficient inertia to drive the motor as a generator when the generator-voltage is suddenly reduced, said compound direct-current self-excited generator comprising an armature-circuit, shunt exciting field-winding means, series exciting field-winding means, circuit-means for energizing said shunt exciting field-winding means in shunt-circuit relation from said armature-circuit, field-rheostat voltage-regulating-means for varying the amount of shunt-excitation of the generator, circuit-means for energizing said series exciting field-winding means in series-circuit relation from said armature-circuit, rectifier-means, and means for connecting said rectifier-means to said series exciting field-winding means for affecting the conditions of current-flow therethrough when the armature-current reverses, whereby the series exciting field-winding means is prevented from leaving the generator with reversed residual magnetism after a period of reversed current-flow from the load-circuit device.

2. A combination including a compound direct-current self-excited generator and a load-circuit device connected to said generator, the combination and arrangement being such that said load-circuit device normally draws power from said generator but, at times, may feed back power into the generator, said generator comprising an armature-circuit, shunt exciting field-winding means, series exciting field-winding means, circuit-means for energizing said shunt exciting field-winding means in shunt-circuit relation from said armature-circuit, circuit-means for energizing said series exciting field-winding means in series-circuit relation from said armature circuit in such polarity that said series exciting field-winding means acts accumulatively when said generator is feeding power to said load-circuit device, and rectifier-means connected in shunt-circuit relation to said series exciting field-winding means in such polarity as to divert a material amount of current therefrom selectively when said generator is receiving power from said load-circuit device.

3. A combination including a compound direct-current self-excited generator and a load-circuit device connected to said generator, the combination and arrangement being such that said load-circuit device normally draws power from said generator but, at times, may feed back power into the generator, said generator comprising an armature-circuit, shunt exciting field-winding means, circuit-means for energizing said shunt exciting field-winding means in shunt-circuit relation from said armature-circuit, two series exciting field-winding means, and circuit-means including two rectifier-means for energizing the two series exciting field-winding means in parallel-circuit relation to each other and in series-circuit relation to said armature-circuit in such manner that one of said two rectifier-means is in the parallel circuit including one of said two series exciting field-winding means whereas the other one of said two rectifier-means is in the parallel circuit including the other one of said two series exciting field-winding means, the polarities of the connections of the two series exciting field-winding means being such that each of said two series field-winding means is acting accumulatively when current is flowing in the conducting diretcion through its associated rectifier-means, and the two rectifier-means being of opposite polarities whereby one is conducting when the generator is feeding power to said load-circuit device and the other is conducting when the generator is receiving power from said load-circuit device.

4. A combination including a compound direct-current self-excited generator and a load-circuit device connected to said generator, the combination and arrangement being such that said load-circuit device normally draws power from said generator but, at times, may feed back power into the generator, said generator comprising an armature-circuit, shunt exciting field-winding means, series exciting field-winding means, circuit-means for energizing said shunt exciting field-winding means in shunt-circuit relation from said armature-circuit, circuit-means including serially connected rectifier-means for energizing said series exciting field-winding means in series-circuit relation from said armature-circuit in such polarity of connections that said rectifier-means is conducting and said series exciting field-winding means is cumulative when said generator is feeding power to said load-circuit device, and a parallel-connected circuit-means in parallel-circuit relation to said serially connected rectifier-means and series exciting field-winding means for conducting a major portion of the armature-current when the generator is receiving power from said load-circuit device.

5. A combination including a compound direct-current self-excited generator and a load-circuit device connected to said generator, means for electrically connecting the load-circuit device for operation from said generator, means for driving said generator at a substantially constant speed at all times when said generator is in operative condition, said load-circuit device including a shunt motor and a driven load having sufficient inertia to drive the motor as a generator when the generator-voltage is suddenly reduced, said compound direct-current self-excited generator comprising an armature-circuit, shunt exciting field-winding means, series exciting field-winding means, circuit-means for energizing said shunt exciting field-winding means in shunt-circuit relation from said armature-circuit, field-rheostat voltage-regulating-means for varying the amount of shunt-excitation of the generator, circuit-means for energizing said series exciting field-winding means in series-circuit relation from said armature-circuit rectifier-means, and means for connecting said rectifier-means to said series exciting field-winding means for causing such current-flow therethrough that said series exciting field-winding means acts in the same direction as the shunt exciting field-winding means, regardless of whether said generator is feeding power to said load-circuit device or is receiving power from said load-circuit device, whereby the series exciting field-winding means is prevented from leaving the generator with reversed residual magnetism after a period of reversed current-flow from the load-circuit device.

GEORGE L. ABELL.